Patented Mar. 12, 1946

2,396,264

UNITED STATES PATENT OFFICE 2,396,264

FUNGICIDE

Max N. Huffman, Woodworth, Wis., assignor to U. S. Standard Products Company, Woodworth, Wis., a corporation of Wisconsin No Drawing. Application January 22, 1944, Serial No. 519,347

3 Claims. (Cl. 260—468)

This invention relates to improvements in fungicides. More particularly, it pertains to a novel synthetic fungicidal compound which is a reaction product of a camphoric anhydride and a 4-chlorophenol which can be administered externally for the treatment of human fungus infections, and the provision of such a compound is a principal object of the invention.

More specifically, an obpect of the present invention is the provision of a fungicide comprising a 4-chlorophenyl hydrogen camphorate which can be administered externally by means of any suitable vehicle for the treatment of human fungus infections, such as, for example, the disease commonly known as athlete's foot.

Another object of the invention is the provision of a chemical compound which is a reaction product between a camphoric anhydride and a 4-chlorophenol which results in a powerful but innocuous fungicide, and which has as an additional characteristic the important property of functioning as an anesthetic when used for the purposes intended.

Other objects of the invention will in part be obvious and will in part appear hereinafter.

The invention accordingly comprises a chemical compound possessing the characteristics, properties and the relation of components which will be exemplified in the product about to be described in the following illustrative examples, each setting forth a process of manufacture, and the scope of the application of which will be indicated in the claims.

Example I 4-chlorophenol (23.35 g.) was dissolved in 250 ml. dry benzene in a reaction flask. Sodium methoxide (8.90 g.) was added and the mixture stirred rapidly for 30–45 minutes. Then d-camphoric anhydride (30.00 g.) was added and the stirring continued for an additional 30 minutes, resulting in the formation of the sodium salt of 4-chlorophenyl hydrogen d-camphorate. The reaction mixture was transferred to a separatory funnel using 500 ml. of 2% sodium bicarbonate and partitioned into a two-layer system. The aqueous layer contained the desired material as the sodium salt, and it was acidified with concentrated hydrochloric acid (reaction acid to Congo red) and then extracted with benzene. The benzene layer was washed with water until neutral and dried over anhydrous sodium sulfate. On filtration and evaporation of the benzene an oily residue resulted. After the addition of naphtha there resulted a white crystalline compound which crystallized in the form of needles in rosettes. This proved to be 4-chlorophenyl hydrogen d-camphorate. It had a melting point of 128–129° C.

By substituting dl-camphoric anhydride for d-camphoric anhydride and operating in a similar fashion, 4-chlorophenyl hydrogen dl-camphorate was formed. This compound melted at 137.5–138.5° C.

Example II 4-chloro-3-methylphenol 12.3 g.) was dissolved in 125 ml. dry benzene in a reaction flask. Sodium methoxide (4.45 g.) was added and the mixture stirred mechanically for 30–45 minutes. d-Camphoric anhydride (15.0 g.) was then added and the stirring continued for an additional 30 minutes. The reaction mixture was transferred to a separatory funnel using 200 ml. of 2% sodium bicarbonate and partitioned to give two layers. The aqueous layer was separated and acidified with hydrochloric acid (reaction acid to Congo red) and then extracted with 300 ml. of benzene. The benzene layer was washed with water until neutral and dried over anhydrous sodium sulfate. After filtration of the dried benzene solution and subsequent evaporation, an oily residue resulted. On the addition of naphtha a white crystalline compound appeared as needles in rosettes. This proved to be 4-chloro-3-methylphenyl hydrogen d-camphorate. This compound melted at 106.5–107.5° C.

By substituting dl-camphoric anhydride for d-camphoric anhydride and operating in a similar fashion, 4-chloro-3-methylphenyl hydrogen dl-camphorate resulted. This compound melted at 120–121° C.

Example III 4-chloro-3,5-dimethylphenol (14.2 g.) was dissolved in 250 ml. dry benzene by stirring mechanically for 30 minutes. Sodium methoxide (4.45 g.) was then added and the resulting mixture stirred for an additional 30 minutes. d-Camphoric anhydride (15.0 g.) was then stirred into the mixture, and after 10 minutes stirring a gelatinous mass formed. This was allowed to stand at room temperature for 2–3 hours and then transferred to a separatory funnel using 250 ml. of 2% sodium bicarbonate. After shaking, the aqueous layer was separated and acidified with concentrated hydrochloric acid. The acid mixture was then shaken with 300 ml. of benzene to dissolve the camphoric acid ester. The benzene layer was separated, dried over sodium sulfate, and evaporated. After adding naphtha to the oily residue, 4-chloro-3,5-dimethylphenyl hydrogen d-camphorate crystallized in the form of rosettes of densely-packed crystals. This compound melted at 117–118° C.

By substituting dl-camphoric anhydride for d-camphoric anhydride and operating in a similar fashion, 4-chloro-3,5-dimethylphenyl hydrogen dl-camphorate resulted. This compound melted at 129.5–130.5° C.

By means of the compounds embodied by the present invention the objects hereinbefore set forth can readily and efficiently be attained. However, since certain changes may be made in the above described compounds and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

What I claim as new and desire to secure by Letters Patent, is:

1. A chemical compound, which comprises a 4-chloro-3,5-dimethylphenyl hydrogen camphorate.

2. A chemical compound, which comprises a 4-chloro-3,5-dimethylphenyl hydrogen d-camphorate.

3. A chemical compound, which comprises a 4-chloro-3,5-dimethylphenyl hydrogen dl-camphorate.

MAX N. HUFFMAN.